United States Patent [19]

Ushiyama

[11] Patent Number: 5,115,239
[45] Date of Patent: May 19, 1992

[54] MAGNETIC ABSOLUTE POSITION ENCODER WITH AN UNDULATING TRACK

[75] Inventor: Shigeyuki Ushiyama, Yamanashi, Japan

[73] Assignee: Fanuc Ltd., Minamitsuru, Japan

[21] Appl. No.: 474,027

[22] PCT Filed: Aug. 21, 1989

[86] PCT No.: PCT/JP89/00846
§ 371 Date: Apr. 19, 1990
§ 102(e) Date: Apr. 19, 1990

[87] PCT Pub. No.: WO90/02312
PCT Pub. Date: Mar. 8, 1990

[30] Foreign Application Priority Data

Aug. 31, 1988 [JP] Japan ................. 63-215186

[51] Int. Cl.⁵ ............. H03M 1/22; G01D 5/18
[52] U.S. Cl. ......................... 341/15; 341/8; 340/870.31
[58] Field of Search .......... 360/100.1, 136; 341/4, 341/6, 7, 8, 9, 10, 11, 15, 16; 336/135; 340/870.31

[56] References Cited

U.S. PATENT DOCUMENTS

| | | | |
|---|---|---|---|
| 2,926,335 | 2/1960 | Bower | 341/15 X |
| 3,553,466 | 1/1971 | Johnston | 341/9 X |
| 4,628,298 | 12/1986 | Hafle et al. | 341/13 X |
| 4,764,767 | 8/1988 | Ichikawa et al. | 336/135 X |
| 4,882,536 | 11/1989 | Meyer | 341/15 X |
| 4,951,048 | 8/1990 | Ichikawa et al. | 341/15 |

FOREIGN PATENT DOCUMENTS

| | | | |
|---|---|---|---|
| 54-118259 | 9/1979 | Japan . | |
| 60-242565 | 12/1985 | Japan | 360/100.1 |
| 62-110113 | 5/1987 | Japan . | |
| 63-206613 | 8/1988 | Japan . | |

Primary Examiner—Howard L. Williams
Attorney, Agent, or Firm—Staas & Halsey

[57] ABSTRACT

A magnetic-type absolute position encoder includes a magnetic drum having a magnetic material magnetized on a circumferential surface thereof is rotated and absolute position in one revolution is calculated based on sinusoidal and cosinusoidal signals outputted by a magnetic reluctance element arranged to oppose the circumferential surface. The polarities of a magnetic material (2) magnetized on the circumferential surface of a magnetic drum (1) are aligned in the direction of the rotational axis of the magnetic drum to form a magnetization track (3). In a case where a sinusoidal signal having n cycles per revolution is to be generated, the magnetization track is made to undulate n cycles per revolution in the direction of the rotational axis. A sinusoidal signal and a cosinusoidal signal having a phase difference of 90° with respect to this sinusoidal signal are extracted from the magnetization track (3) by a magnetic reluctance element (4), and absolute position in one revolution is calculated by position calculating means (5) using these sinusoidal and cosinusoidal signals.

8 Claims, 9 Drawing Sheets

RESISTANCE VALUE OF 63a : SMALL

RESISTANCE VALUE OF 63b : LARGE

MAGNETIC ABSOLUTE POSITION ENCODER WITH AN UNDULATING TRACK

CROSS REFERENCE TO RELATED APPLICATION

This application may be related to International Application PCT/JP89/00506.

BACKGROUND OF THE INVENTION

1. Field of the Invention

This invention relates to a magnetic-type absolute position encoder and, more particularly, to a magnetic-type absolute position encoder capable of detecting, as an absolute position, the rotational position, etc., of a rotary shaft of a motor or the like driving a machine tool.

2. Description of Related Art

Many encoders of optical-type have been proposed as absolute position encoders (for example, see International Application PCT/JP89/00506). An optical absolute position encoder of this kind has a rotary coding disk and a fixed coding disk, with the rotary coding disk being formed so as to obtain sinusoidal and cosinusoidal outputs the numbers of cycles per revolution of which differ from one another in each of a plurality of channels. The sinusoidal and cosinusoidal outputs in each channel enter respective A/D converters and are converted into digital data in order to successively generate information (angle information) indicative of the angular position of the rotary coding disk. Thereafter, the digital data obtained by A/D-converting the sinusoidal and cosinusoidal outputs in each channel are combined channel by channel and the result is used as address information of a ROM storing position information. A predetermined number of items of position information are interpolated in one wavelength of each channel. It is assumed that the number of channels is four, that one, 16, 256 and 4096 cycles of the sinusoidal and cosinusoidal outputs are generated per revolution in each channel, and that $2^4$ items of position information are interpolated in one wavelength of each channel, in which case the foregoing absolute position encoder is capable of detecting absolute position at a resolution of $360°/2^{16}$.

Figures 6A, 6B:
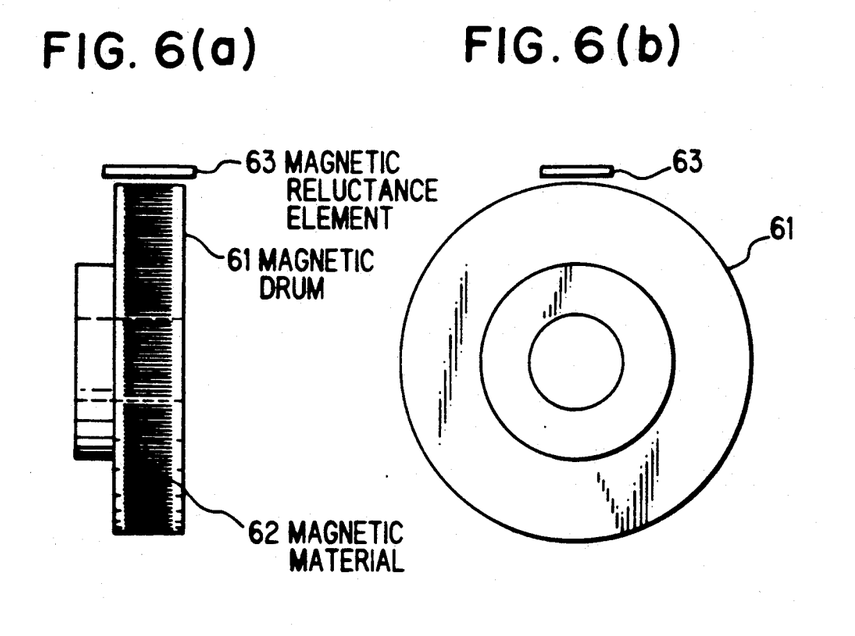
FIGS. 6(a), 6(b) are a front view and side view showing a magnetic rotation sensor (MR sensor)

A magnetic-type absolute position encoder has not been employed in the prior art. The reason will now be explained. FIG. 6 is a diagram showing the construction of a magnetic rotation sensor (MR sensor), in which numeral 61 denotes a magnetic drum. The drum is provided with a magnetic material 62 forming a number of small poles. Numeral 63 denotes a magnetic reluctance element disposed in close proximity to the magnetic drum 61 to sense the magnetic flux of the magnetic material 62.

The magnetic drum 61 consists of a non-magnetic cylinder with a diameter of 50 mm having a magnetic paint baked onto its side face, and the magnetic paint is magnetized to have a number of poles having a pitch of amount 120 μm. The magnetic reluctance element 63 comprises a magnetic reluctance element main body consisting of a permalloy thin-film pattern formed on glass, and a wiring pattern for forming a magnetic circuit. The shape and dimensions of the pattern on the main body correspond to the magnetization pattern on the drum. Thus an output signal in accordance with the amount of rotation of the drum can be obtained.

Figure 7A:
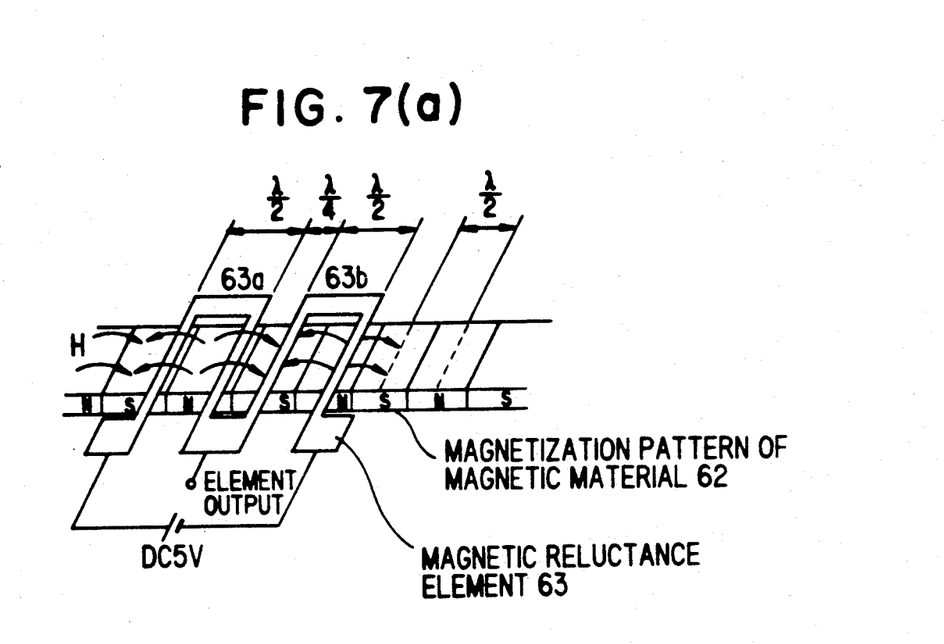
FIGS. 7(a), 7(b) are views for describing the operating principle of a magnetic rotation sensor.
Figure 7B:
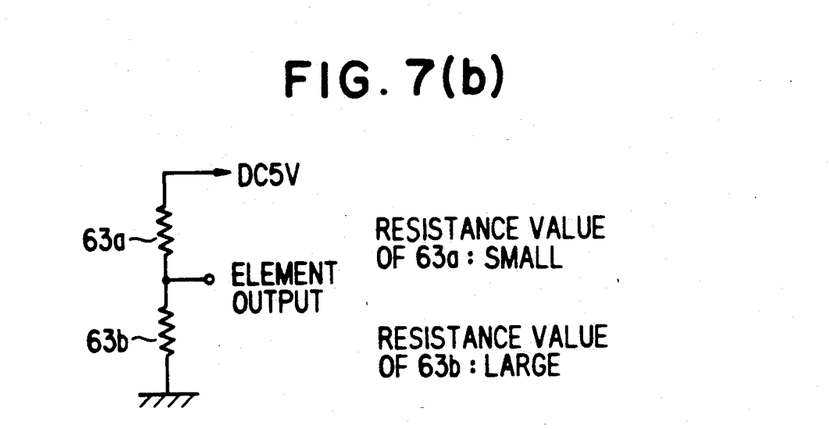

The operating principle of the magnetic rotation sensor will be described with reference to FIG. 7. The characteristic of the magnetic reluctance element 63 is such that an electrical resistance value R, which prevails when a current is passed through the pattern in the longitudinal direction thereof, decreases when a magnetic field H orthogonal to the pattern is present. Accordingly, when the pattern of the magnetic reluctance element 63 is disposed to correspond to the magnetization pattern of the drum, or in other words, when magnetic reluctance elements 63a, 63b are disposed so as to be out of phase by λ/4 (where λ is the magnetized pattern pitch), as shown in FIG. 7(a), the resistance values of the magnetic reluctance elements 63a, 63b become smaller in alternating fashion in accordance with the movement of the magnetization pattern. In the state shown in FIG. 7(a), the resistance value of the magnetic reluctance element 63a becomes smaller and that of the magnetic reluctance element 63b becomes larger. As a result, in accordance with the rotation of the drum (the movement of the magnetized patterns), a sinusoidal signal output can be obtained from an output terminal shown in FIG. 7(b).

Figure 8:
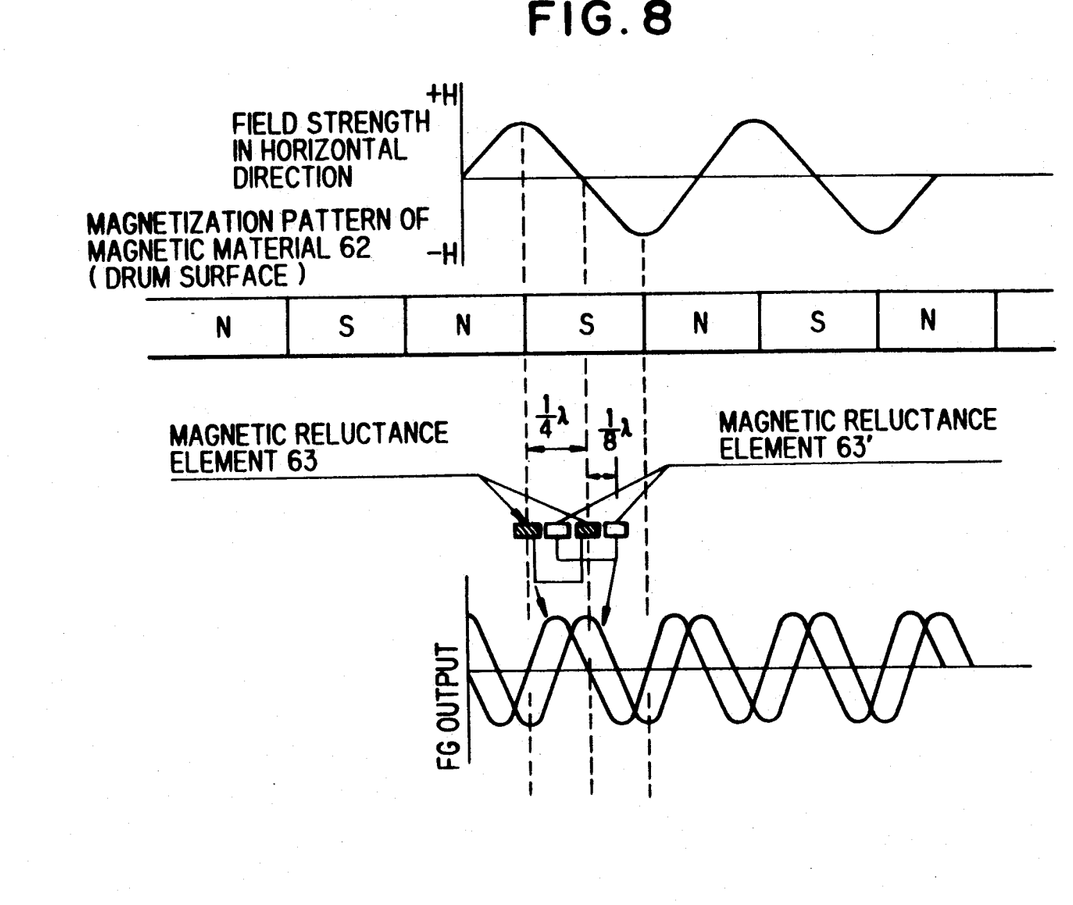
FIG. 8 is a view for describing the arrangement pattern of first and second magnetic reluctance elements.

In actuality, as shown in FIG. 8, second magnetic reluctance elements 63', 63' are arranged at positions offset by λ/8 from respective ones of two first magnetic reluctance elements 63, 63 disposed so as to be out of phase by λ/4. These elements are connected into a bridge-like configuration, whereby the necessary sinusoidal and cosinusoidal outputs are obtained.

Figure 9:
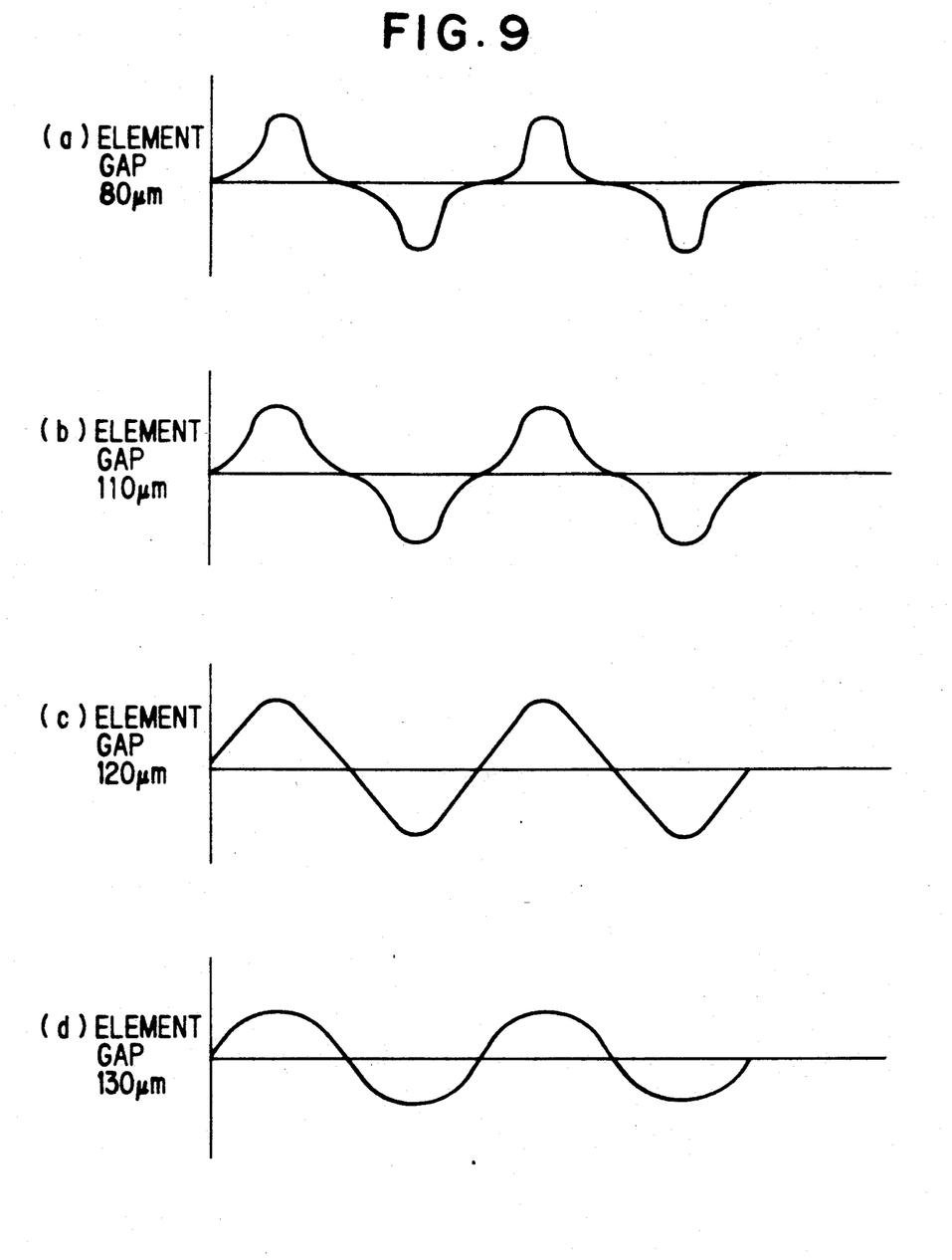
FIGS. 9(a) -9(d) are waveform characteristic diagrams showing the relationship between magnetization pitch and gap.

In the above-described magnetic rotation sensor, the magnetization pitch of the magnetic material 62 and the gap between the magnetic material and the magnetic reluctance element have a close correlation, as shown in FIG. 9. The Figure illustrates the influence of this gap upon a magnetization pitch of 120 μm. More specifically, the smaller the gap with respect to the magnetization pitch, the greater the distortion in the output obtained from the sensor. The larger the gap with respect to the magnetization pitch, the smaller the output amplitude. When the gap is equal to the magnetization pitch, the sinusoidal and cosinusoidal outputs obtained have the maximum amplitude and are free of distortion.

Accordingly, in a case where an absolute position encoder is fabricated using a magnetic rotation sensor, and if it is attempted to obtain outputs of one-cycle, 16-cycle, 256-cycle and 4096-cycle sinusoidal and cosinusoidal signals employed in the abovementioned proposed optical absolute position encoder, the difference in the magnetization pitch of each channel will be too large and the gap possessed by the magnetic reluctance element 63 (or 63') must be provided with steps. Thus, problems arise in terms of construction.

In addition, an arrangement in which sinusoidal and cosinusoidal signals having a low number of cycles (e.g., one cycle) per revolution are generated magnetically is impossible to realize. Further a magnetic-type absolute position encoder having a simple structure cannot be obtained.

Accordingly, an object of the present invention is to provide a magnetic-type absolute position encoder in which the gap of the magnetic reluctance element of each channel can be made uniform, sinusoidal and cosinusoidal signals having a low number of cycles can be generated, and the absolute position of a moving body can be detected.

SUMMARY OF THE INVENTION

In order to attain the foregoing object, a magnetic-type absolute position encoder according to the invention of this application detects absolute position in one revolution in the following manner. Specifically, the polarities of a magnetic material magnetized on the circumferential surface of a magnetic drum are aligned in the direction of the rotational axis of the magnetic drum to form a magnetization track. In a case where a sinusoidal signal having n cycles per revolution is to be generated, the magnetization track is made to undulate n cycles per revolution in the direction of the rotational axis. A sinusoidal signal having n cycles per revolution and a cosinusoidal signal having a phase difference of 90° with respect to this sinusoidal signal are extracted from the magnetization track by a magnetic reluctance element. Absolute position in one revolution is calculated by position calculating means using these sinusoidal and cosinusoidal signals.

DESCRIPTION OF THE PREFERRED EMBODIMENTS

Figures 1A, 1B:
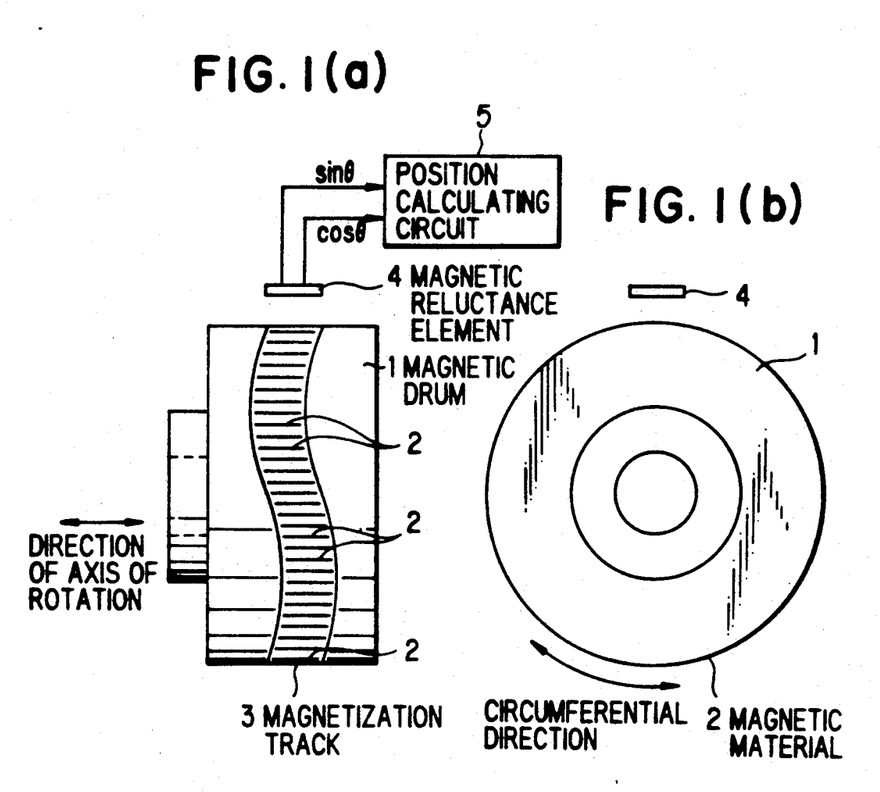
FIGS. 1(a) and 1(b) are views showing the construction of a magnetic type absolute position encoder illustrating an embodiment of the present invention.

FIGS. 1(a) and 1(b) are views showing the construction of a magnetic-type absolute position encoder illustrating an embodiment of he present invention, in which FIG. 1(a) is a side view and FIG. 1(b) is a front view.

Numeral 1 denotes a magnetic drum, 2 a magnetic material magnetized on the circumferential surface of the cylindrical magnetic drum 1, 3 and a magnetization track obtained by magnetizing the magnetic material in a fixed direction, namely in the direction of the axis of rotation of the magnetic drum, 4 a magnetic reluctance element nd a 5 a position calculating circuit.

The magnetic material 2 is magnetized on the circumferential surface of he magnetic drum 1 to form a magnetization track 3, and the magnetization polarities of the magnetic material 2 are aligned in the direction of the rotational axis of the magnetic drum 1. The magnetization track 3 is made to undulate in the direction of the he rotational axis in conformity with the desired number of cycles of the sinusoidal signal. For example, in a case where a sinusoidal signal having n cycles per revolution is to be generated, the magnetization track is made to undulate n cycles per revolution int he direction f the rotational axis.

A sinusoidal signal having n cycles per revolution and a cosinusoidal signal having a phase difference of 90° with respect to this sinusoidal signal are extracted from the magnetization track 3 by a magnetic reluctance element 4, and absolute position in one revolution is calculated by the position calculating circuit 5 using these sinusoidal and cosinusoidal signals.

Figure 2:
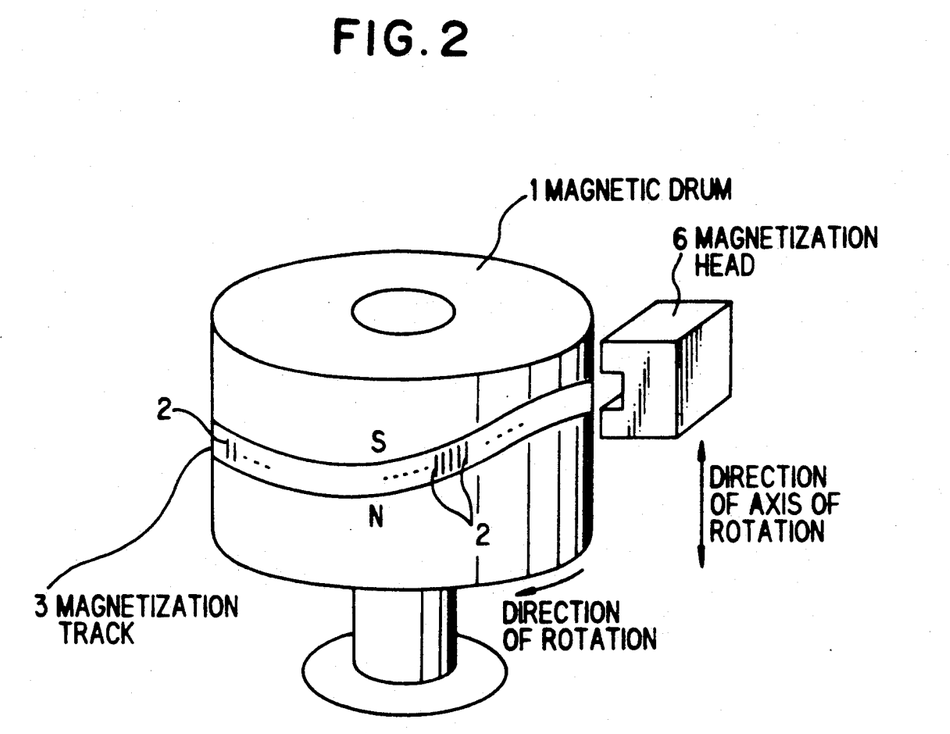
FIG. 2 is a diagram for describing a method of magnetizing a magnetic drum.

FIG. 2 is a diagram for describing a method of magnetizing the magnetic drum, in which numeral 1 denotes the magnetic drum, 2 the magnetic material deposited on the circumferential surface of the cylindrical magnetic drum 2 at a fixed pitch, 3 the magnetization track obtained by magnetizing the magnetic material 2 in a fixed direction, and 6 a magnetizing head.

The magnetic drum 1 is rotated at a constant speed, and the magnetizing head 6 is moved up and down in synchronism with the rotation of the magnetic drum 1 to magnetize the magnetic material 2 on the circumferential surface of the drum. The polarities of the magnetic material 2 to be magnetized are such that the S, N orientation is aligned in conformity with the axis of rotation of the magnetic drum 1. When magnetization is performed, the magnetizing head 6 is moved up and down a predetermined number of times per revolution in conformity with the number of cycles desired. For example, in a case where a sinusoidal signal having n cycles per revolution is to be generated, the magnetic head 6 is moved up and down, in the direction of the axis of rotation, n times per revolution. As a result, the magnetization track 3 will undulate n cycles/revolution.

Figure 3A:
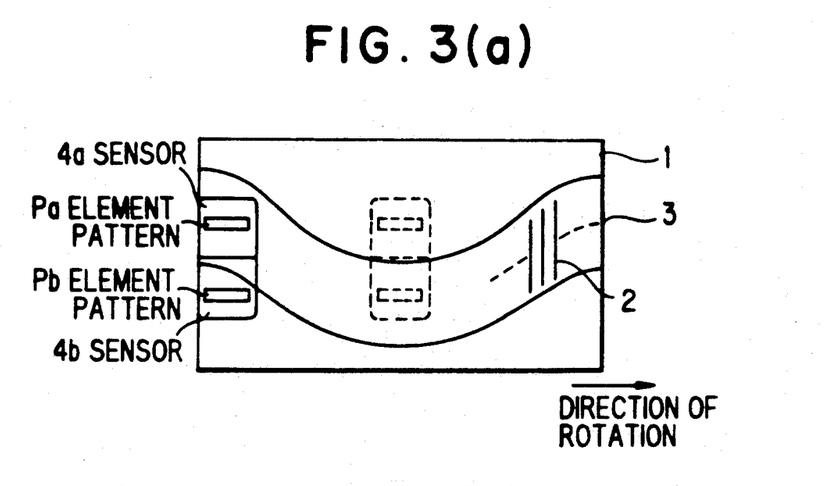
FIGS. 3(a), 3(b) and 3(c) are viewes for describing an operation for outputting a sinusoidal signal according to the present invention.
Figure 3B:
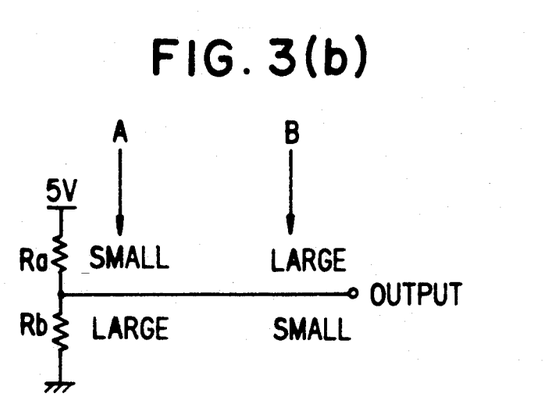
Figure 3C:
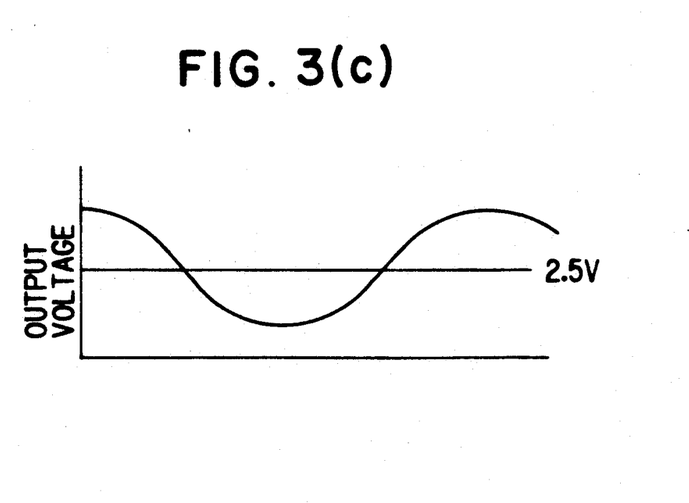

The operation for outputting the sinusoidal signal according to the present invention will now be described with reference to FIGS. 3(a), 3(b), and 3(c). FIG. 3(a) is a developed view of the magnetic drum which shows the positional relationship between the magnetic reluctance element and the magnetization track. FIG. 3(b) is a view for describing a change in resistance value in accordance with the positional relationship of FIG. 3(a): and FIG. 3(c) is an output waveform of the magnetic reluctance element.

The magnetic reluctance element 4 shown in FIG. 1 has a first magnetic reluctance element for extracting a sinusoidal signal $\sin\theta$ and a second magnetic reluctance element for extracting a cosinusoidal signal $\cos\theta$ having a phase difference of 90° with respect to the sinusoidal signal obtained from the first magnetic reluctance element. Sensors 4a, 4b shown in FIG. 3(a) construct the first magnetic reluctance element. As mentioned above, the characteristic of the magnetic reluctance element is such that electrical resistance values Ra, Rb, which prevail when an electric current is passed through element patterns Pa, Pb in the longitudinal direction thereof, decrease when a magnetic field H is present orthogonal to the longitudinal direction. Consequently, when the element patterns Pa, Pb of the sensors 4a, 4b are disposed to correspond to the magnetization track 3, as shown in FIGS. 3(a), 3(b), and 3(c), the resistance values Ra, Rb of the sensors 4a, 4b become small in alternating fashion with movement of the magnetization track 3. More specifically, as shown in FIG. 3(b), the resistance value Ra of sensor 4a becomes small and the resistance value Rb of sensor 4b becomes large at the A position, whereas the resistance value Ra of sensor 4a becomes large and the resistance value Rb of sensor 4b becomes small at the B position. As a result, a sinusoidal signal output can be obtained from the output terminal with rotation of the drum (i.e., with the undulating motion of the magnetization track), as depicted in FIG. 3(c).

In the magnetic type absolute position encoder of the present invention, the magnetic drum 1 is provided four channels of magnetization tracks made to undulate in conformity with a sinusoidal signal having a desired number of cycles, and magnetization is performed in such a manner that sinusoidal and cosinusoidal signals having one cycle (expressed by 1) per revolution are obtained from a first magnetization track CH1, sinusoidal and cosinusoidal signals having 16 cycles (expressed by 16) per revolution are obtained from a second magnetization track CH2, sinusoidal and cosinusoidal signals having 256 cycles (expressed by 256) per revolution are obtained from a third magnetization track CH3, and sinusoidal and cosinusoidal signals having 4096 cycles (expressed by 4096 per revolution are obtained from a fourth magnetization track CH4.

Figure 4:
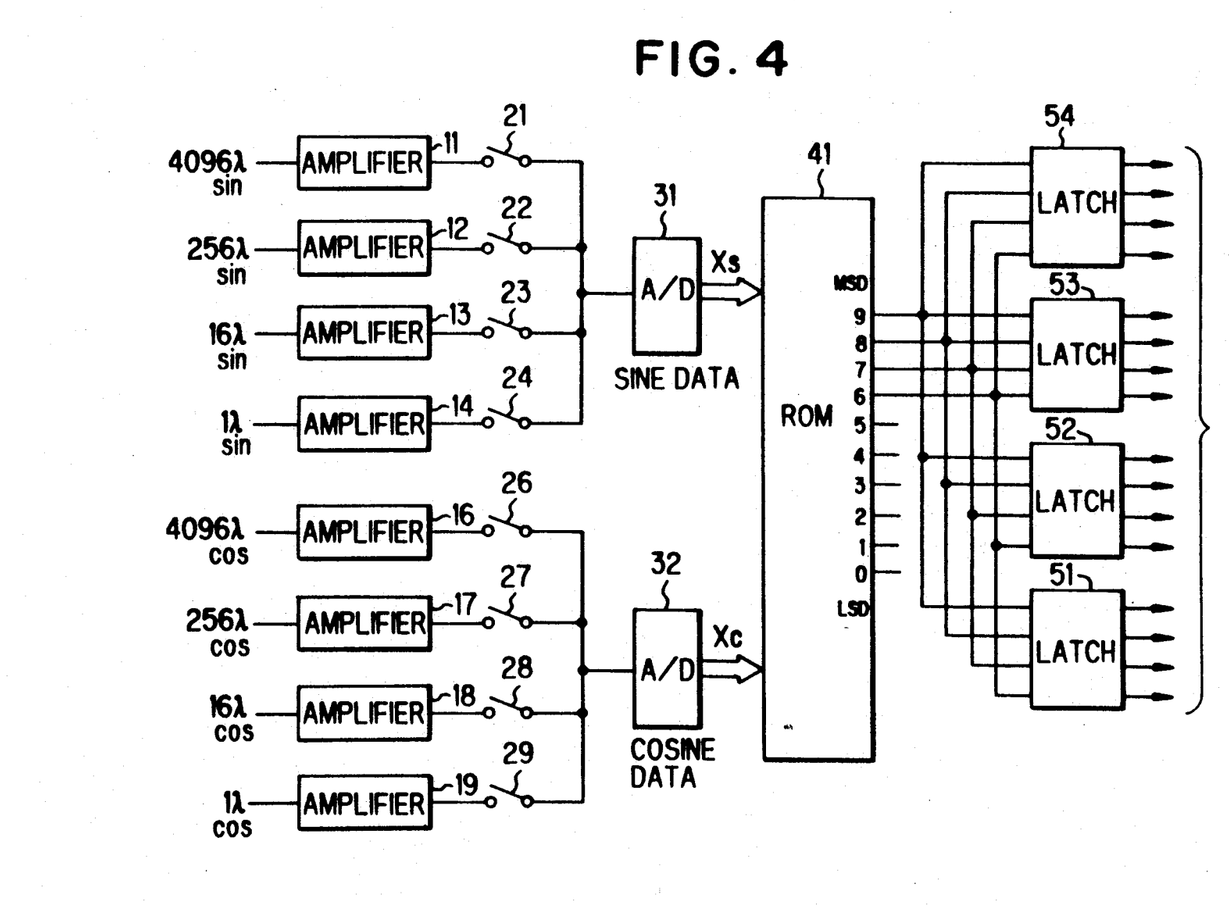
FIG. 4 is a block diagram of a position calculating circuit shown in FIG. 1.

FIG. 4 is a block diagram of the position calculating circuit 5 shown in FIG. 1.

Illustrated in FIG. 4 is a case in which the magnetic drum 1 is provided with the first through fourth magnetization tracks $CH_1-CH_4$. Specifically, a case is illustrated in which the signals obtained from each of these magnetization tracks are a sinusoidal signal $1\lambda\sin$ having one cycle per revolution, a sinusoidal signal $16\lambda\sin$ having 16 cycles per revolution, a sinusoidal signal $256\lambda\sin$ having 256 cycles per revolution and a sinusoidal signal $4096\lambda\sin$ having 4096 cycles per revolution. Other signals obtained from each magnetization track are cosinusoidal signals $1\lambda\cos$, $16\lambda\cos$, $256\lambda\cos$ and $4096\lambda\cos$ having an electric phase difference of 90° relative to respective sinusoidal signals mentioned above.

Numerals 11 through 14 denote amplifiers for amplifying respective ones of the sinusoidal signals $1\lambda\sin$ through $4096\lambda\sin$, 21 through 24 analog switches for selection of magnetization tracks connected to the output sides of respective ones of the amplifiers 11 through 14, 16 through 19 amplifiers for amplifying the cosinusoidal signals $1\lambda\cos$ through $4096\lambda\cos$, and 26 through 29 analog switches for magnetization track selection connected to the output sides of respective ones of the amplifiers 16 through 19.

Assume now with regard to detecting information relating to the angle of the magnetic drum 1 that switches 21 and 26 are turned on. In such case, after the sinusoidal signal $4096\lambda\sin$ and cosinusoidal signal $4096\lambda\cos$ from the magnetic reluctance element 3 are amplified by the corresponding amplifiers 11, 16, the amplified signals pass through the switches 21, 26 and enter A/D converters 31, 32, respectively. Each of the A/D converters 31, 32 converts its input into digital data of a prescribed number of bits in conformity with the required resolution and supplies this digital data (so-called sine data $X_s$ and cosine data $X_c$) to a ROM 41 as address inputs, e.g., row-and-column address inputs. Values obtained by multiplying $\tan^{-1}(X_s/X_c)$ by a suitable constant are converted into binary numbers stored in the ROM, 141 at addresses designated by the sine data $X_s$ and cosine data $X_c$. Accordingly, when an address is entered, the angle information is read out of the ROM 41 and stored in a latch circuit 51.

For example, assume that the input sinusoidal signal $4096\lambda\sin$ is 0.5 V and that the cosinusoidal signal $4096\lambda\cos$ is also 0.5 V. In such case, these signals are each converted into a prescribed digital quantity, e.g., "0100" by the respective A/D converters 31, 32. That is, the sine data $X_s$ and cosine data $X_c$ inputted to the ROM 41 as address, information are both assumed to be "0100". Data which has a value ($\frac{1}{8}$) obtained by multiplying $\tan^{-1}1=45°$ by 1/360 (expressed as a 10-bit binary number "0010000000") is stored in the ROM at the address designated by the sine data $X_s$ and cosine data $X_c$. Accordingly, this 10-bit data is read out and the higher-order four-bit data is latched in the latch circuit 51.

Next, the magnetization channel selection switches are changed over from 21, 26 to 22, 27, the sinusoidal signal $256\lambda\sin$ and cosinusoidal signal $256\lambda\cos$ which enter at this time are similarly converted into digital data by the A/D converters 31, 32. With the sine data $X_s$ and cosine data $X_c$ thus obtained again serving as address signals for the ROM 41, 10-bit data is read out of the ROM from the corresponding address, and the higher-order four-bit data is latched in the latch circuit 52, as in the manner set forth above.

Thereafter, and in similar fashion, the magnetization channel selection switches are successively changed over to 23, 28 and then to 24, 29. The sine data $X_s$ and cosine data $X_c$ obtained by A/D-converting the entering signals 16sin, $16\lambda\cos$ and then $1\lambda\sin$, $1\lambda\cos$ are successively input to the ROM 41 as address signals. The out 10-bit data stored at the designated addresses is read out of the ROM 41, and the four higher-order bits of these items of data are successively latched in latch circuits 53, 54.

Thus, the magnetization tracks (the four tracks $CH_1-CH_4$ in this case) are successively changed over, the two-phase input signals (the sinusoidal and cosinusoidal signals) of each magnetization track are A/D-converted, the digital data $X_s$, $X_c$ obtained by the A/D-conversion is converted into ROM address information, and the ROM data read out from this address is successively latched in the latch circuits. By combining the data in the latch circuits, absolute position can be detected. For example, this data can be used to generate information indicative of the angle of the rotary coding disk by 16-bit data extending from the four-bit data latched in the latch circuit 54 to the four-bit data latched in the latch circuit 51. In this case, the absolute position of the disk can be detected, with the number of divisions per revolution being $2^{16}$, i.e., with a resolution of $2^{16}$/revolution.

Figure 5:
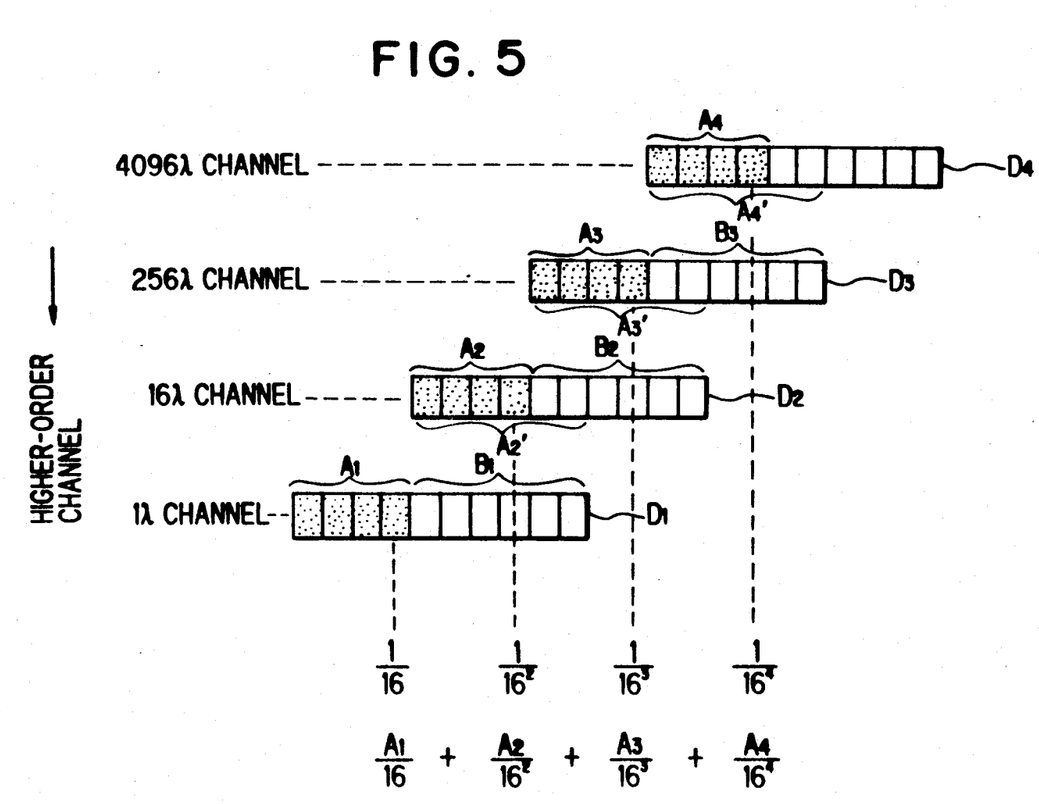
FIG. 5 is a view for describing absolute position data.

FIG. 5 is a view for describing the absolute position data obtained by the foregoing operation. Let $A_4$ represent a hexadecimal numeric value of the four higher-order bits of interpolated data $D_4$ in the least significant magnetization track $CH_4$ ($4096\lambda$ magnetization track), $A_3$ a hexadecimal numeric value of the four higher-order bits of interpolated data $D_3$ in the $256\lambda$ magnetization track, $A_2$ a hexadecimal numeric value of the four higher-order bits of interpolated data $D_2$ in the $16\lambda$ magnetization track, and $A_1$ a hexadecimal numeric value of interpolated data $D_1$ in the most significant magnetization track ($1\lambda$ magnetization track). In such case, the absolute position data is as follows, expressed in hexadecimal notation:

$$A_1 \cdot 16^{-1} + A_2 \cdot 16^{-2} + A_3 \cdot 16^{-3} + A_4 \cdot 16^{-4}$$

It should be noted that if a hexadecimal numeric value $A_i$, $i = (1-4)$ is expressed as follows using binary notation:

$$A_i = a_{i3} \cdot 2^3 + a_{i2} \cdot 2^2 + a_{i1} \cdot 2^1 + a_{i0}$$

then the absolute position data may written as follows:

$$a_{13} \cdot 2^{-1} + a_{12} \cdot 2^{-2} + a_{11} \cdot 2^{-3} + a_{10} \cdot 2^{-4} +$$
$$a_{23} \cdot 2^{-5} + a_{22} \cdot 2^{-6} + a_{21} \cdot 2^{-7} + a_{20} \cdot 2^{-8} + \ldots +$$
$$a_{43} \cdot 2^{-13} + a_{44} \cdot 2^{-14} + a_{44} \cdot 2^{-15} + a_{40} \cdot 2^{-16}$$

Described in the foregoing is a magnetic-type absolute position encoder which calculates absolute position per revolution using a magnetic drum. However, it is also possible to construct a magnetic-type absolute position encoder in which a linear magnetic member composed of a magnetic material magnetized in linear fashion is moved relative to a sensor and absolute position is calculated, every predetermined linear interval, within the interval on the basis of the sinusoidal and cosinusoidal signals obtained. More specifically, the polarities of a magnetic material magnetized on the linear side surface of a linear magnetic member are aligned in an axial direction orthogonal to the direction of movement to form a magnetization track, and in a case where a sinusoidal signal having n cycles per linear interval is to be generated, the magnetization track is caused to undulate n cycles per linear interval in a direction orthogonal to the direction of movement, a sinusoidal signal and a cosinusoidal signal having a phase difference of 90° with respect to the sinusoidal signal are extracted from this magnetization track by a magnetic reluctance element, and absolute position in one linear interval is calculated by position calculating means using these sinusoidal and cosinusoidal signals.

Thus, in accordance with the present invention, the arrangement is such that the polarities of a magnetic material magnetized on the circumferential surface of a magnetic drum are aligned in the direction of the rotational axis of the magnetic drum to form a magnetization track, and in a case where a sinusoidal signal having n cycles per revolution is to be generated, the magnetization track is made to undulate n cycles per revolution in the direction of the rotational axis. A sinusoidal signal having n cycles per revolution and a cosinusoidal signal having a phase difference of 90° with respect to this sinusoidal signal are extracted from the magnetization track by a magnetic reluctance element, and absolute position in one revolution is calculated by position calculating means using these sinusoidal and cosinusoidal signals. As a result, a structure can be obtained in which the magnetization pitch of the magnetic material is uniform irrespective of the number of cycles, thus making it possible to uniformalize the gap of the magnetic reluctance element. Further, in accordance with the present invention, there can be provided a magnetic-type absolute position encoder in which sinusoidal and cosinusoidal signals having a low number of cycles can be generated with ease, and in which the absolute position of a moving body can be detected with excellent precision.

I claim:

1. A magnetic-type absolute position encoder, comprising:
   a magnetic drum including a magnetic material magnetized on a circumferential surface thereof, said magnetic drum being rotatable around a rotational axis, and said magnetic material having polarities which are arranged to form tracks which undulate n cycles per revolution in the direction of the rotational axis, a width of the magnetization track being substantially constant;
   a magnetic reluctance element arranged to oppose the circumferential surface, and so that the rotation of said magnetic drum causes sinusoidal and cosinusoidal signals having a phase difference of substantially 90° to be output by said magnetic reluctance element; and
   absolute position calculating means for computing an absolute position in one revolution based on the sinusoidal and cosinusoidal signals.

2. An absolute position encoder according to claim 1, wherein said magnetic material is arranged to include four magnetization tracks including a 1 cycle/revolution magnetization track, a 16 cycles/revolution magnetization track, a 256 cycles/revolution magnetization track and a 4096 cycles/revolution magentiazation track.

3. An absolute position encoder according to claim 2, wherein said position calculating means includes
   a ROM which stores a plurality of data corresponding to the sinuosidal and cosinusoidal signals provided by said magnetic reluctance element which plurality of data can be accessed at a plurality of respective ROM addresses;
   A/D converter means for A/D-converting respective ones of sinusoidal and cosinusoidal signals provided by said magnetic reluctance element;
   means for adopting A/D converter outputs corresponding to the sinusoidal and cosinusoidal signals provided by said magnetic reluctance element as a ROM address; and
   means for detecting absolute position in one revolution by serially combining the data so that the data represents the absolute position.

4. An apparatus comprising:
   a magnetic member having a planar surface and a longitudinal axis;
   a magnetic material formed on the planar surface, said magnetic material being magnetized such that polarities of the magnetic material are aligned in a direction of an axis orthogonal to the longitudinal axis to form a magnetization track, and such that the magnetization track undulates n cycles per linear interval int he direction of the longitudinal axis, a width of the magnetization track being substantially constant;
   magnetic reluctance means or extracting a sinusoidal signal and a cosinusoidal signal having a phase difference of substantially 90° with respect to the sinusoidal signal, from the magnetization track; and
   position calculating means for calculating absolute position in one linear interval using the sinusoidal and cosinusoidal signals.

5. A magnetic drum, comprising:
   a cylindrical member having a circumferential surface and a rotational axis; and
   a magnetic material formed on the circumferential surface, said magnetic material being magnetized at substantially constant intervals along he circumferential surface about he rotational axis so as to form a magnetization track which undulates at substantially n cycles in a direction along the rotational axis of said drum,
   a width of the magnetization track being substantially constant.

6. A magnetic member, comprising:
a planar member having a planar surface and a longitudinal axis; and
a magnetic material formed on said planar surface, said magnetic material being magnetized oat constant intervals along a direction of the longitudinal axis to form a magnetization track which undulates at substantially n cycles along the longitudinal axis for a predetermined linear distance in a direction orthogonal to the longitudinal axis, a width of the magnetization track being substantially constant.

7. A method of making a magnetic drum having a circumferential surface, comprising the steps of:
forming a magnetic material on the circumferential surface; and
magnetizing the magnetic material st substantially constant intervals along the circumferential surface about a rotational axis of said drum to form a magnetization track which undulates substantially n cycles in a direction along he rotational axis, a width of the magnetization track being substantially constant.

8. A method of making a magnetic member having a planar surface and a longitudinal axis, comprising the steps of:
forming a magnetic material on the planar surface of the magnetic member; and
magnetizing the magnetic material sat substantially constant intervals along the longitudinal axis to form a magnetization track which undulates n cycles for a predetermined linear distance along the longitudinal axis in a direction orthogonal to the longitudinal axis, a width of the magnetization track being substantially constant.

* * * * *

UNITED STATES PATENT AND TRADEMARK OFFICE
CERTIFICATE OF CORRECTION

PATENT NO. : 5,115,239            Page 1 of 2
DATED : May 19, 1992
INVENTOR(S) : Ushiyama It is certified that error appears in the above-identified patent and that said Letters Patent is hereby corrected as shown below:

Column 3, line 65, delete "he";

Column 4, line 2, change "f" to --of--;

Column 4, line 42, change "3(a); and" to

--3(a).--.

Column 5, line 11, change "1" to --1$\lambda$--;

Column 5, line 12, change "CH1" to

--$CH_1$--;

Column 5, line 14, change "16" to --16$\lambda$--;

Column 5, line 15, change "CH2" to --$CH_2$--;

Column 5, line 16, change "256" to --256$\lambda$--;

Column 5, line 17, change "CH3" to --$CH_3$--;

Column 5, line 19, change "4096" to --4096$\lambda$--;

UNITED STATES PATENT AND TRADEMARK OFFICE
CERTIFICATE OF CORRECTION

PATENT NO. : 5,115,239
DATED : May 19, 1992
INVENTOR(S) : Ushiyama

It is certified that error appears in the above-identified patent and that said Letters Patent is hereby corrected as shown below:

Column 5, line 20, change "CH4" to --$CH_4$--;

Column 5, line 62, change "141" to --41--.

Column 6, line 28, delete "out".

Column 8, line 50, change "or" to --for--;

Column 8, line 62, change "he" to --the--.

Column 8, line 63, change "he" to --the--.

Column 9, line 5, change "oat" to --at--;

Column 9, line 16, change "st" to --at--;

Column 10, line 10, change "sat" to --at--.

Signed and Sealed this

Twelfth Day of October, 1993

Attest:

BRUCE LEHMAN

Attesting Officer     Commissioner of Patents and Trademarks